United States Patent
Laugier et al.

(10) Patent No.: US 11,187,826 B2
(45) Date of Patent: Nov. 30, 2021

(54) CHARACTERIZATION OF SUBSURFACE REGIONS USING MOVING-WINDOW BASED ANALYSIS OF UNSEGMENTED CONTINUOUS DATA

(71) Applicant: Chevron U.S.A. Inc., San Ramon, CA (US)

(72) Inventors: Fabien J. Laugier, Houston, TX (US); Alicia Downard, Golden, CO (US); Tao Sun, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 65 days.

(21) Appl. No.: 16/706,579

(22) Filed: Dec. 6, 2019

(65) Prior Publication Data

US 2021/0173117 A1 Jun. 10, 2021

(51) Int. Cl.
*G01V 99/00* (2009.01)

(52) U.S. Cl.
CPC .................................. *G01V 99/005* (2013.01)

(58) Field of Classification Search
CPC .................................................. G01V 99/005
See application file for complete search history.

(56) References Cited

U.S. PATENT DOCUMENTS

| | | | |
|---|---|---|---|
| 2,653,220 A | 9/1953 | Bays | |
| 7,079,953 B2 | 7/2006 | Thorne | |
| 7,516,055 B2 | 4/2009 | Strebelle | |
| 7,630,517 B2 | 12/2009 | Mirowski | |
| 7,706,981 B2 | 4/2010 | Wilkinson | |
| 8,271,244 B2 | 9/2012 | Ross | |
| 8,666,149 B2 | 3/2014 | Thorne | |
| 9,187,984 B2 | 11/2015 | Usadi | |
| 9,753,180 B2 | 9/2017 | Suzuki | |
| 9,804,282 B2 | 10/2017 | Xu | |
| 10,036,829 B2 | 7/2018 | Ghayour | |
| 10,190,403 B2 | 1/2019 | Samuel | |
| 10,287,858 B2 | 5/2019 | Ghayour | |
| 10,317,569 B2 | 6/2019 | Sun | |
| 10,319,143 B2 | 6/2019 | Branets | |
| 10,365,261 B2 | 7/2019 | Montgomery | |

(Continued)

FOREIGN PATENT DOCUMENTS

| CN | 102540256 | 7/2012 |
|---|---|---|
| CN | 103454678 | 12/2013 |

(Continued)

OTHER PUBLICATIONS

Ana-Maria Ilisei et al., Automatic Classification of Subsurface Features in Radar Sounder Data Acquired in Icy Areas, 2013, IEEE, pp. 3530-3533 (Year: 2013).*

(Continued)

*Primary Examiner* — Mischita L Henson
(74) *Attorney, Agent, or Firm* — Esplin & Associates, PC

(57) ABSTRACT

Unsegmented continuous subsurface data may be analyzed using one or more moving windows to characterize a subsurface region. Unsegmented continuous subsurface data may be scanned using the moving window(s). Probabilities that portions of the subsurface region include a subsurface feature may be determined based on analysis of the portions of the unsegmented continuous subsurface data within the moving window(s).

18 Claims, 8 Drawing Sheets

(56) References Cited

U.S. PATENT DOCUMENTS

| | | |
|---|---|---|
| 10,816,440 B2 | 10/2020 | Amendt |
| 10,984,590 B1 | 4/2021 | Li |
| 2002/0013687 A1 | 1/2002 | Ortoleva |
| 2005/0180261 A1 | 8/2005 | Mandal |
| 2006/0041409 A1 | 2/2006 | Strebelle |
| 2006/0052938 A1 | 3/2006 | Thorne |
| 2006/0136162 A1 | 6/2006 | Hamman |
| 2007/0100593 A1 | 5/2007 | Deffenbaugh |
| 2007/0219724 A1 | 9/2007 | Li |
| 2008/0015784 A1 | 1/2008 | Dorn |
| 2009/0262603 A1 | 10/2009 | Hurley |
| 2009/0306945 A1 | 12/2009 | Wu |
| 2009/0319243 A1 | 12/2009 | Suarez-Rivera |
| 2010/0149917 A1 | 6/2010 | Imhof |
| 2010/0332205 A1 | 12/2010 | Tillier |
| 2011/0002194 A1 | 1/2011 | Imhof |
| 2011/0054857 A1 | 3/2011 | Moguchaya |
| 2011/0054869 A1 | 3/2011 | Li |
| 2011/0213600 A1 | 9/2011 | Strebelle |
| 2011/0231164 A1 | 9/2011 | Zhang |
| 2011/0240310 A1 | 10/2011 | Sun |
| 2011/0264430 A1 | 10/2011 | Tapscott |
| 2011/0272161 A1* | 11/2011 | Kumaran ............... G01V 1/301 166/369 |
| 2012/0029828 A1 | 2/2012 | Pepper |
| 2012/0215628 A1 | 8/2012 | Williams |
| 2012/0221302 A1 | 8/2012 | Lewandowski |
| 2012/0221306 A1 | 8/2012 | Hurley |
| 2013/0046524 A1 | 2/2013 | Gathogo |
| 2013/0064040 A1 | 3/2013 | Imhof |
| 2013/0118736 A1 | 5/2013 | Usadi |
| 2013/0151161 A1 | 6/2013 | Imhof |
| 2013/0179080 A1 | 7/2013 | Skalinski |
| 2013/0246031 A1 | 9/2013 | Wu |
| 2013/0294197 A1 | 11/2013 | Vallikkat Thachaparambil |
| 2013/0318141 A1 | 11/2013 | Maucec |
| 2013/0329986 A1 | 12/2013 | Strebelle |
| 2014/0035912 A1 | 2/2014 | Julian |
| 2014/0316706 A1 | 10/2014 | Grant |
| 2014/0358440 A1 | 12/2014 | Pyrcz |
| 2015/0066460 A1 | 3/2015 | Klinger |
| 2015/0088424 A1 | 3/2015 | Burlakov |
| 2015/0112656 A1 | 4/2015 | Rodriguez-Herrera |
| 2015/0212231 A1 | 7/2015 | Borouchaki |
| 2015/0219793 A1 | 8/2015 | Li |
| 2015/0241591 A1 | 8/2015 | Burmester |
| 2015/0309197 A1 | 10/2015 | Dimitrov |
| 2016/0041279 A1 | 2/2016 | Casey |
| 2016/0048933 A1 | 2/2016 | Strebelle |
| 2016/0103245 A1 | 4/2016 | Pyrcz |
| 2016/0139299 A1 | 5/2016 | Leger |
| 2016/0313463 A1 | 10/2016 | Wahrmund |
| 2016/0342718 A1 | 11/2016 | Moyner |
| 2017/0011149 A1* | 1/2017 | Liu ......................... E21B 41/00 |
| 2017/0153343 A1* | 6/2017 | Almarhoon ............. E21B 47/16 |
| 2017/0227451 A1 | 8/2017 | Hoegerl |
| 2018/0003839 A1 | 1/2018 | Lowell |
| 2018/0217283 A1 | 8/2018 | Klinger |
| 2018/0225778 A1 | 8/2018 | Grant |
| 2018/0334902 A1* | 11/2018 | Olsen ................... G01V 99/005 |
| 2019/0026405 A1 | 1/2019 | Ramsay |
| 2019/0094414 A1 | 3/2019 | Prochnow |
| 2019/0243028 A1 | 8/2019 | Von Gonten |
| 2020/0380390 A1 | 12/2020 | Sun |
| 2021/0048556 A1 | 2/2021 | Tao |
| 2021/0222523 A1 | 7/2021 | Sun |
| 2021/0223431 A1 | 7/2021 | Hern |
| 2021/0302620 A1 | 9/2021 | Hern |

FOREIGN PATENT DOCUMENTS

| | | |
|---|---|---|
| CN | 103454686 | 12/2013 |
| CN | 104111473 | 10/2014 |
| CN | 105372705 | 3/2016 |
| CN | 105717542 | 6/2016 |
| CN | 105954802 | 9/2016 |
| CN | 107942382 | 4/2018 |
| CN | 107976713 | 5/2018 |
| EP | 2917770 | 9/2015 |
| FR | 3039679 | 2/2017 |
| GB | 2474740 | 4/2011 |
| WO | 2017019718 | 2/2017 |
| WO | 2018208634 | 11/2018 |

OTHER PUBLICATIONS

Hawie, Nicolas, Jacob Covault, Dallas Dunlap, and Zoltan Sylvester 2017. "Slope-fan Depositional Architecture from High-resolution Forward Stratigraphic Models". EarthArXiv. Dec. 19. eartharxiv.org/f9dkp. (36 pages).

Yupeng, Li, and Wu Shenghe. "Hierarchical nested simulation approach in reservoir architecture modeling." Petroleum Exploration and Development 40, No. 5 (2013): 676-681.

Sacchi, Quinto, Eloisa Salina Borello, Gert Jan Weltje, and Rory Dalman. "Increasing the predictive power of geostatistical reservoir models by integration of geological constraints from stratigraphic forward modeling." Marine and Petroleum Geology 69 (2016): 112-126.

Efros, A. A., & Freeman, W. T. (2001). Image quilting for texture synthesis and transfer. Proceedings of the 28th Annual Conference on Computer Graphics and Interactive Techniques—SIGGRAPH '01, 341-346. https://doi.org/10.1145/383259.383296.

Hoffimann, J., Scheidt, C., Barfod, A., & Caers, J. (2017). Stochastic simulation by image quilting of process-based geological models. Computers and Geosciences, 106(February), 18-32. https://doi.org/10.1016/j.cageo.2017.05.012.

Mariethoz, G., Renard, P., & Straubhaar, J. (2010). The direct sampling method to perform multiple-point geostatistical simulations. Water Resources Research, 46(11). https://doi.org/10.1029/2008WR007621.

Mahmud, K., Mariethoz, G., Caers, J., Tahmasebi, P., & Baker, A. (2014). Simulation of Earth textures by conditional image quilting. Water Resources Research, 50(4), 3088-3107. https://doi.org/10.1002/2013WR015069.

Bertoncello, Antoine , Caers, Jef, Biver, Pierre, CaumonGuillaume, (2008). Geostatistics on Stratigraphic Grid. ERE department / Stanford University (pp. 1-16).

PCT International Search Report and Written Opinion, International Application No. PCT/US20/31869, dated Aug. 4, 2020. 2 pages.

Liu et al. "Visual Analytics of Stratigraphic Correlation for Multi-attribute Well-logging Data Exploration." Jul. 2019 IEEE Access PP(99):1-1, Jul. 16, 2019, [online] [retrieved on Oct. 5, 2020 (Oct. 5, 2020)) Retrieved from the Internet< URL: https://ieeexplore.ieee.org/document/8764395>. entire document (13 pages).

PCT International Search Report and Written Opinion, International Application No. PCT/US20/44874, dated Dec. 17, 2020. (8 pages).

PCT International Search Report and Written Opinion, International Application No. PCT/US20/61212, dated Dec. 21, 2020. (7 pages).

PCT International Search Report and Written Opinion, International Application No. PCT/US2020/61489, dated Jan. 28, 2021 (7 pages).

PCT International Search Report and Written Opinion, International Application No. PCT/US2020/61323, dated Feb. 19, 2021 (8 pages).

PCT International Search Report and Written Opinion, International Application No. PCT/US21/12733, dated Mar. 23, 2021 (11 pages).

Tahmasebi et al. Multiple-point geostatistical modeling based on the cross-correlation 1-15 functions. Mar. 8, 2012 (Mar. 8, 2012). [retrieved on Mar. 5, 2021]. Retrieved from the Internet: <URL: http://www.uwyo.edu/pejman/_files/docs/tahmasebi_ccsim.pdf> pp. 779-796.

Zhou et al. A Stratigraphic Prediction Method Based on Machine Learning. Aug. 29, 2019 1-15 (Aug. 29, 2019). (retrieved on Mar. 5, 2021]. Retrieved from the Internet: <URL: https://www.mdpi.com/2076-3417/9/17/3553/pdf> pp. 1-29.

Zhou et al. A Stratigraphic Prediction Method Based on Machine Learning. Aug. 29, 2019 (Aug. 29, 2019). [retrieved on Mar. 5, 2021]. Retrieved from the Internet: <URL: https://www.mdpi.com/2076-3417/9/17/3553/pdf> pp. 1-29.

(56) References Cited

OTHER PUBLICATIONS

Harris S, Santoshini S, Kashem S, Viard T, Levannier A, Benabbou A. Complex geological modeling and quality assurance using unstructured grids. InAbu Dhabi International Petroleum Exhibition & Conference Nov. 12, 2018. Society of Petroleum Engineers. 20 pages.
Rubio, R.H., Koppe, V.C., Costa, J.F.C.L. and Cherchenevski, P.K., 2015. How the use of stratigraphic coordinates improves grade estimation. Rem: Revista Escola de Minas, 68(4), pp. 471-477.
Santoshini S, Harris S, Kashem S, Levannier A, Benabbou A, Viard T, Mace L. Depogrid: Next Generation Unstructured Grids for Accurate Reservoir Modeling and Simulation. InSPE Russian Petroleum Technology Conference Oct. 15, 2018. Society of Petroleum Engineers. 20 pages.
PCT International Search Report and Written Opinion for Application No. PCT/US21/23008, dated Jun. 8, 2021 (8 pages).
One Petro Search Results, Jun. 15, 2021, 8 pp. (Year: 2021).
Scheevel et al., Principal Component Analysis Applied to 3D Seismic Data for Reservoir Property Estimation, Feb. 1, 2001, SPE Reservoir Evaluation & Engineering 4 (01), pp. 64-72 (Year: 2001).
Amaru, Maisha, Tao Sun, Lisa Goggin, and Ashley Harris. "Integration of computational stratigraphy models and seismic data for subsurface characterization." The Leading Edge 36, No. 11 (2017): 947a1-947a6 (Year: 2017).
Chandra, Viswasanthi, Patrick William Michael Corbett, Sebastian Geiger, and Hamidreza Hamdi. Improving reservoir characterization and simulation with near-wellbore modeling. SPE Reservoir Evaluation & Engineering 16, No. 02 (2013): 183-193 (Year: 2013).
Dalman, Rory Af, and Gert Jan Weltje. SimClast: An aggregated forward stratigraphic model of continental shelves.' Computers & geosciences 38, No. 1 (2012): 115-126 (Year: 2012).
Hantschel, Thomas, and Armin I. Kauerauf. Fundamentals of basin and petroleum systems modeling. Section 8.9. Springer Science & Business Media, 2009, pp399-404 (Year: 2009).
Hawie, N., M. Callies, and E. Marfisi. "Integrated Multi-Disciplinary Forward Stratigraphic Modelling Workflow In Petroleum Systems Assessment." In SPE Middle East Oil & Gas Show and Conference OnePetro, 2017. 8 pages (Year: 2017).
Michelena, Reinaldo J. et al., "Similarity Analysis: A New Tool to Summarize Seismic Attributes Information", Apr. 1998, TheLeading Edge. (Year: 1998).
PCT International Search Report and Written Opnion for Application No. PCT/US21/29956, dated Aug. 2, 2021 (7 pages).
Weltje, Gert Jan, Rory Dalman, Pantelis Karamitopoulos, and Quinto Sacchi. "Reducing the uncertainty ofstatic reservoir models: implementation of basin-scale geological constraints." In EAGE Annual Conference & Exhibitionincorporating SPE Europec. OnePetro, 2013 (Year: 2013).

\* cited by examiner

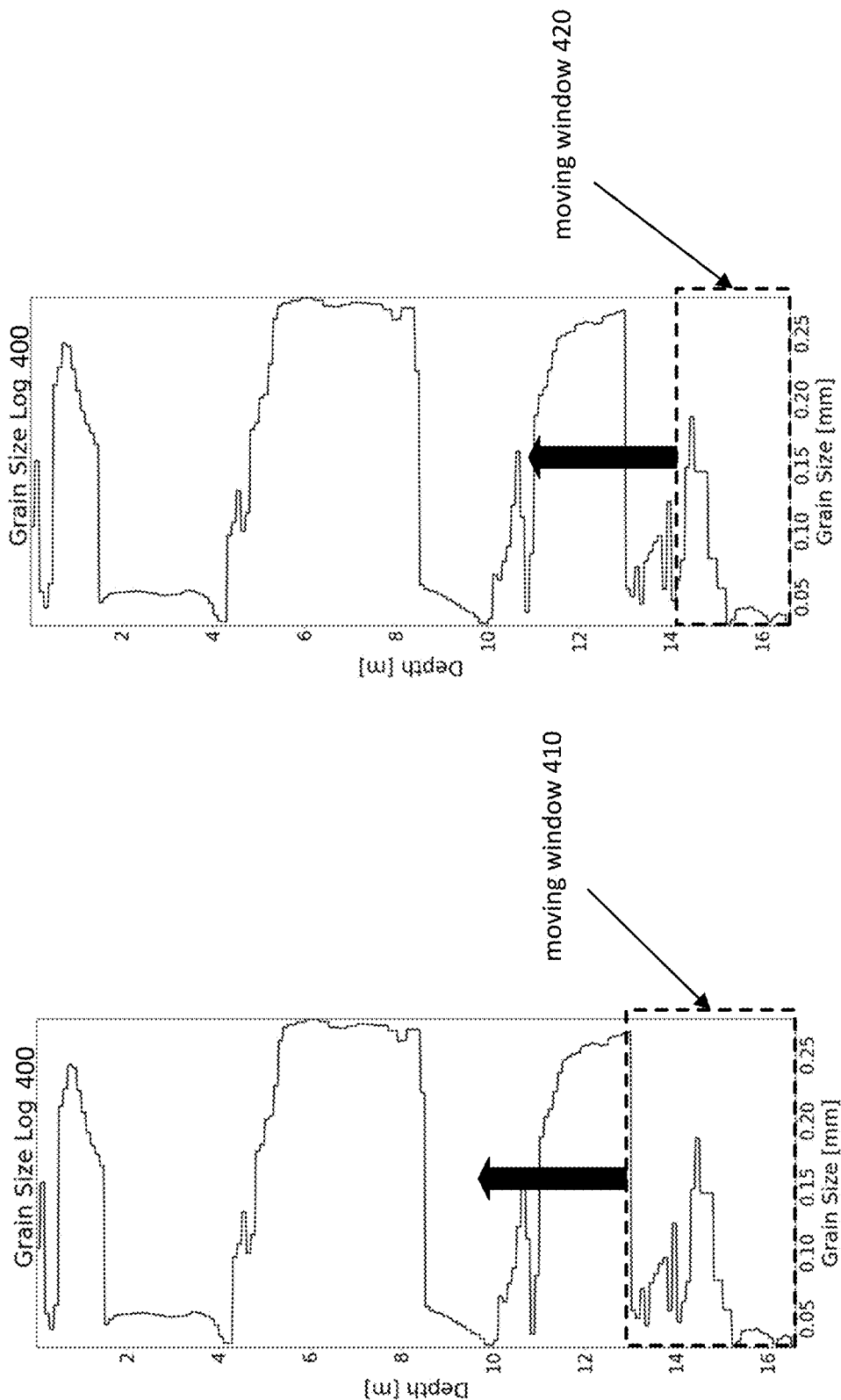

CHARACTERIZATION OF SUBSURFACE REGIONS USING MOVING-WINDOW BASED ANALYSIS OF UNSEGMENTED CONTINUOUS DATA

FIELD

The present disclosure relates generally to the field of subsurface region characterization using moving-window-based analysis of unsegmented continuous data.

BACKGROUND

Conventional analysis of subsurface data (e.g., well-log, one-dimensional time-series data) require segmentation of the subsurface data. Segmentation of the subsurface data may be difficult, time-consuming, and subjective.

SUMMARY

This disclosure relates to characterizing subsurface regions. Subsurface information and/or other information may be obtained. The subsurface information may define unsegmented continuous data and/or other data. The unsegmented continuous data may characterize one or more properties of a subsurface region. Portions of the unsegmented continuous data may correspond to portions of the subsurface region. A set of moving windows for the unsegmented continuous data may be obtained. The set of moving windows may include one or more moving windows. The unsegmented continuous data may be scanned with the set of moving windows. Probabilities that the portions of the subsurface region include a subsurface feature may be determined based on analysis of the portions of the unsegmented continuous data within the set of moving windows and/or other information.

A system that characterizes subsurface regions may include one or more electronic storage, one or more processors and/or other components. The electronic storage may store subsurface information, information relating to unsegmented continuous data, information relating to properties of subsurface regions, information relating to moving windows, information relating to a set of moving windows, information relating to scanning of unsegmented continuous data, information relating to subsurface features, information relating to probabilities that portions of subsurface regions include subsurface features, and/or other information.

The processor(s) may be configured by machine-readable instructions. Executing the machine-readable instructions may cause the processor(s) to facilitate characterizing a subsurface region. The machine-readable instructions may include one or more computer program components. The computer program components may include one or more of a subsurface information component, a moving window component, a scan component, a subsurface feature component, and/or other computer program components.

The subsurface information component may be configured to obtain subsurface information and/or other information. The subsurface information may define unsegmented continuous data and/or other data. The unsegmented continuous data may characterize one or more properties of the subsurface region. Portions of the unsegmented continuous data may correspond to portions of the subsurface region. In some implementations, the subsurface region may include one or more horizontal well segments, one or more vertical well segments, and/or other well segments.

The moving window component may be configured to obtain a set of moving windows for the unsegmented continuous data. The set of moving windows may include one or more moving windows. In some implementations, the set of moving windows may include multiple moving windows of different sizes. In some implementations, at least one of the different sizes of the multiple moving windows may be determined based on a size of a subsurface feature and/or other information. In some implementations, at least one of the different sizes of the multiple moving windows may be determined independent of a size of the subsurface feature.

The scan component may be configured to scan the unsegmented continuous data with the set of moving windows. The unsegmented continuous data may be scanned with the set of moving windows in a single direction or multiple directions.

The subsurface feature component may be configured to determine probabilities that portions of the subsurface region include one or more subsurface features based on analysis of the portions of the unsegmented continuous data within the set of moving windows and/or other information. In some implementations, the analysis of the portions of the unsegmented continuous data within the set of moving windows may include application of one or more classifiers and/or data analysis (e.g., quantitative analysis, statistical analysis, pattern matching) to the portions of the unsegmented continuous data within the set of moving windows.

In some implementations, different sets of the probabilities over the unsegmented continuous data may be determined based on the set of moving windows including multiple moving windows of different sizes and/or the unsegmented continuous data characterizing multiple properties of the subsurface region. Aggregated probabilities may be determined based on aggregation of the different sets of the probabilities over the unsegmented continuous data and/or other information. In some implementations, the portions of the subsurface region may be labeled as including or not including the subsurface feature(s) based on thresholding of the aggregated probabilities and/or other information.

In some implementations, a subsurface feature may include a feature of a vertical well segment, and determination of the probabilities that the portions of the subsurface region include the subsurface feature may include determination of probabilities that the portions of a horizontal well segment matches the feature of the vertical well segment.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIGS. 4A and 4B illustrate example scanning of unsegmented continuous data with moving windows.

DETAILED DESCRIPTION

The present disclosure relates to characterizing subsurface regions. Unsegmented continuous subsurface data may be analyzed using one or more moving windows to characterize a subsurface region. Unsegmented continuous subsurface data may be scanned using the moving window(s). Probabilities that portions of the subsurface region include a subsurface feature may be determined based on analysis of the portions of the unsegmented continuous subsurface data within the moving window(s). Use of the moving window(s) may enable analysis (e.g., classification, pattern matching, statistical analysis) of the unsegmented continuous subsurface data without knowledge of segment boundaries or discrete segments/packages between different subsurface features. Use of the moving window(s) may remove the need to pre-segment the data before analysis, removing a critical barrier (e.g., time and complexity) to characterizing subsurface using analysis (e.g., classification, pattern matching) on large volumes of data.

Figure 1:
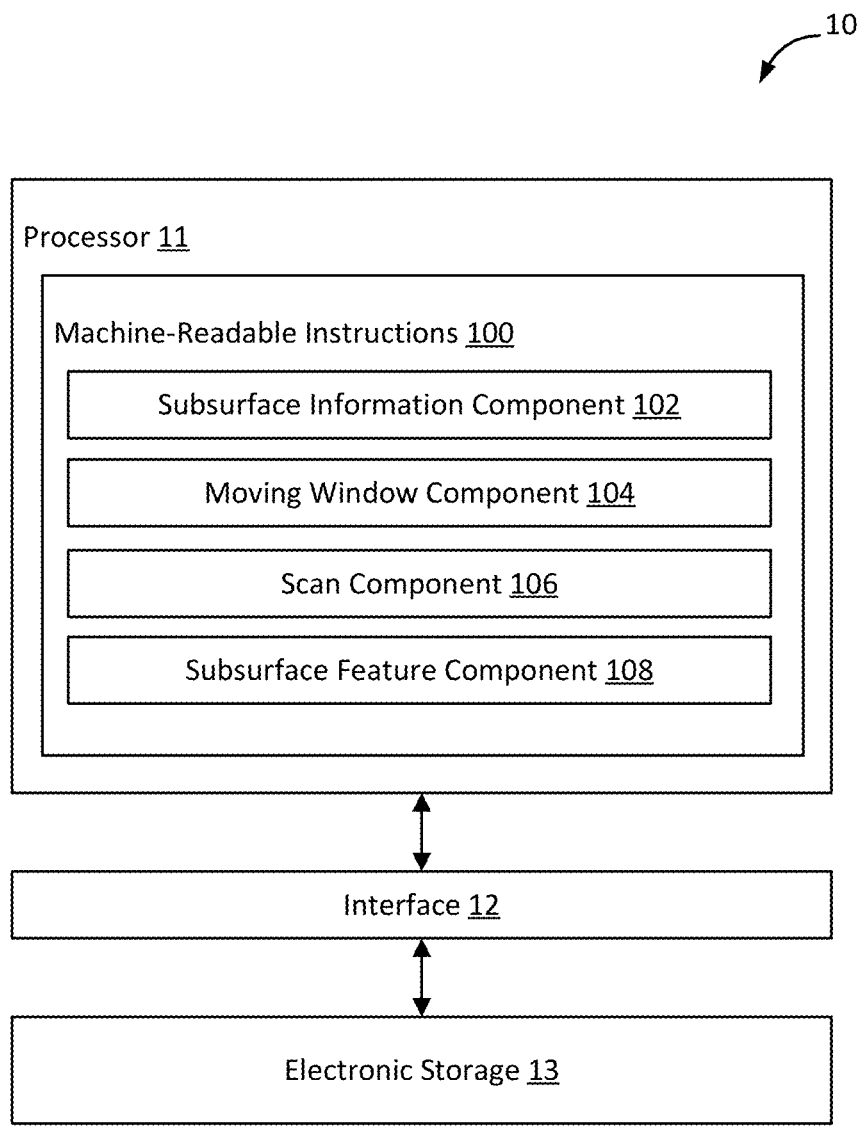
FIG. 1 illustrates an example system that characterizes a subsurface region.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Subsurface information and/or other information may be obtained by the processor 11. The subsurface information may define unsegmented continuous data and/or other data. The unsegmented continuous data may characterize one or more properties of a subsurface region. Portions of the unsegmented continuous data may correspond to portions of the subsurface region. A set of moving windows for the unsegmented continuous data may be obtained by the processor 11. The set of moving windows may include one or more moving windows. The unsegmented continuous data may be scanned with the set of moving windows by the processor 11. Probabilities that the portions of the subsurface region include a subsurface feature may be determined by the processor 11 based on analysis of the portions of the unsegmented continuous data within the set of moving windows and/or other information.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store subsurface information, information relating to unsegmented continuous data, information relating to properties of subsurface regions, information relating to moving windows, information relating to a set of moving windows, information relating to scanning of unsegmented continuous data, information relating to subsurface features, information relating to probabilities that portions of subsurface regions include subsurface features, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate characterizing a subsurface region. The machine-readable instructions 100 may include one or more computer program components. The machine-readable instructions 100 may include one or more of a subsurface information component 102, a moving window component 104, a scan component 106, a subsurface feature component 108, and/or other computer program components.

The subsurface information component 102 may be configured to obtain subsurface information and/or other information. Obtaining subsurface information may include one or more of accessing, acquiring, analyzing, determining, examining, identifying, loading, locating, opening, receiving, retrieving, reviewing, selecting, storing, utilizing, and/or otherwise obtaining the subsurface information. The subsurface information component 102 may obtain subsurface information from one or more locations. For example, the subsurface information component 102 may obtain subsurface information from a storage location, such as the electronic storage 13, electronic storage of a device accessible via a network, and/or other locations. The subsurface information component 102 may obtain subsurface information from one or more hardware components (e.g., a computing device, a component of a computing device) and/or one or more software components (e.g., software running on a computing device). Subsurface information may be stored within a single file or multiple files.

The subsurface information may define unsegmented continuous data (e.g., dataset) and/or other data. Unsegmented continuous data may refer to data that has been captured, generated, and/or recorded in a sequence and/or in a succession, which has not been divided into multiple packages/segments. Unsegmented continuous data may refer to data that has been captured, generated, and/or recorded for a time duration and/or for spatial length (e.g., depth increment) at one or more rates (sampling rates), which has not been broken up or designated into different parts. For example, unsegmented continuous data may include a series of sequential discrete points that are sequential in time and/or depth, which have not been grouped into packages or segments.

Unsegmented continuous data may include data relating to a subsurface region. A subsurface region may refer to a part of earth located beneath the surface/located underground. A subsurface region may refer to a part of earth that is not exposed at the surface of the ground. A subsurface region may be defined in a single dimension (e.g., a point, a line) or in multiple dimensions (e.g., a surface, a volume). A subsurface region may include a physical subsurface region, such as a region in the real world, or a virtual subsurface region, such as a subsurface representation generated/simulated using one or more computer models (e.g., computational stratigraphy models).

For example, a subsurface region may include one or more wells (e.g., physical wells in the real world, virtual wells generated by one or more computer models). The subsurface region may include a well by comprising or containing the entirety of the well or one or more portions of the well. A well may refer to a hole or a tunnel in the ground. A well may be drilled in the ground for exploration and/or recovery of natural resources in the ground. For example, a well may be drilled in the ground to aid in extraction of petrochemical fluid (e.g., oil, gas, petroleum, fossil fuel). As another example, the well may be drilled in the ground for fluid injection. A well may expose and/or run through different types of materials (e.g., sedimentary rocks) in the ground. Unsegmented continuous data may include one or more of data from well logs (generated from a physical well), data from synthetic logs (generated from a virtual well), time-series data relating to the well(s) and/or other data.

The subsurface information may define unsegmented continuous data by including information that defines (e.g., identifies, reflects, quantifies) one or more content, values, qualities, attributes, features, and/or other aspects of the unsegmented continuous data. For example, the subsurface information may define unsegmented continuous data by including information that makes up and/or is used to determine values, characters, and/or symbols of the unsegmented continuous data. For instance, the subsurface information may include information that makes up and/or is used to determine measured and/or simulated values of properties of the subsurface region. Other types of subsurface information are contemplated.

The unsegmented continuous data may characterize one or more properties of the subsurface region. A property of the subsurface region may refer to an attribute, a quality, and/or a characteristic of the subsurface region. A property of the subsurface region may be uniform or non-uniform throughout the subsurface region. For example, the subsurface region may include a well, and the unsegmented continuous data may characterize one or more properties of the well. The properties of the well may include properties of materials within the well (e.g., materials within well cores) and/or properties of materials surrounding the well. For example, properties of the subsurface may include one or more of material type, gamma ray, resistivity, volume of shale, pressure, rock porosity, rock permeability, rock configuration, rock arrangement, rock composition, grain size, formation, structure, layer, and/or other properties of the subsurface.

Different portions of the unsegmented continuous data may correspond to different portions of the subsurface region. For example, the unsegmented continuous data may include data defined as a function of time, such as one or more time-series data. The time-series data may characterize one or more properties of the subsurface region as a function of time at which the data was captured, generated, and/or recorded. Different times at which the time-series data was captured, generated, and/or recorded may correspond to different portions (e.g., vertical location, horizontal location) of the subsurface region. Different times at which the data was captured, generated, and/or recorded may correspond to different distances/lengths of well drilling. In some implementations, the time-series data may include multiple-stacked time-series data (e.g., vertically stacked and/or horizontally stacked time-series data). For instance, multiple-stacked time-series data may include time-series data corresponding to different subsurface measurements (e.g., by different tool), resulting in different measured properties. Other types of time-series data are contemplated.

As another example, the unsegmented continuous data may include data defined as a function of spatial location. Such data may characterize one or more properties of the subsurface region as a function of depth, lateral spatial position (e.g., x-y coordinate in map view), and/or other spatial position. Such data may characterize one or more properties of the subsurface region as a function of distance/length drilled. Other types of spatial location data are contemplated.

In some implementations, the subsurface region may include one or more horizontal well segments, one or more vertical well segments, and/or other well segments. A well segment may refer to a part of a well. A well segment may include and/or be defined by one or more materials within a part of the well (e.g., sedimentary rock within a part of the well). A well segment may include and/or be defined by one or more materials surrounding a part of the well (e.g., sedimentary rock surrounding a part of the well). A well segment may include a horizontal well segment, a vertical well segment, and/or other well segment.

A horizontal well segment may include a part of the well that is drilled in a horizontal direction or near horizontal direction. A horizontal well segment may include a part of the well that extends in a horizontal direction or near horizontal direction. A horizontal direction may include a direction that is parallel to the horizon and/or the ground. A horizontal direction may include a direction that is parallel to a layer, a formation, and/or a stratigraphic unit in the ground. For example, a known depth in the ground and/or a horizontal/angled layer may be used as a line/surface/volume from which the horizontal directionality of wells are calibrated. A part of the well drilled or extending in near horizontal direction may include the part of the well deviating away from a line parallel to the horizon. A part of the well drilled or extending in near horizontal direction may include the part of the well drilled or extending more in the horizontal direction than in the vertical direction. For example, a horizontal well segment may have inclinations away from a line parallel to the horizon, such as up to 15-25 degrees or more. A horizontal well segment may be part of a horizontal well, a deviating well, or other wells. Other types of horizontal well segment are contemplated.

A vertical well segment may include a part of the well that is drilled in a vertical direction or near vertical direction. A vertical well segment may include a part of the well that extends in a vertical direction or near vertical direction. A vertical direction may include a direction that is perpendicular to the horizon and/or the ground. A vertical direction may include a direction that is perpendicular to a layer, a formation, and/or a stratigraphic unit in the ground. For example, a known depth in the ground and/or a horizontal/angled layer may be used as a line/surface/volume from which the vertical directionality of wells are calibrated. A part of the well drilled or extending in near vertical direction may include the part of the well deviating away from a line perpendicular to the horizon. A part of the well drilled or extending in near vertical direction may include the part of the well drilled or extending more in the vertical direction than in the horizontal direction. For example, a vertical well segment may have inclinations away from a line perpendicular to the horizon, such as up to 15-25 degrees or more. A vertical well segment may be part of a vertical well, a deviating well, or other wells. Other types of vertical well segment are contemplated.

Understanding features of the subsurface region may be important for subsurface operations. For example, characterization and interpretation of reservoir type (or Environment of Deposition (EOD)) may be critical for addressing the key subsurface challenges of predicting reservoir volumes, heterogeneity, and connectivity of a reservoir which impact Estimated Ultimate Recovery (EUR) of hydrocarbons from the reservoir. To make more robust and reliable decisions regarding appraisal and development well locations and EUR forecasts, more robust reservoir characterization (e.g., characterizing if a subsurface feature is included or likely within a subsurface region) is needed. Integrated and robust subsurface characterization from well logs may be crucial in all subsurface assets, but particularly where seismic does not have capability to image the reservoir heterogeneity and where drilling is limited due to high costs such as in the deep-water locations, or where well performance can range an order of magnitude over as little as tens of feet vertically. Reservoir characterization of well logs may be performed by persons (e.g., subject matter experts), but interpretations are commonly qualitative and subjective, which may lead to ambiguity.

Machine learning approaches may be leveraged to focus on quantitative classification for physical and/or virtual well log analysis. Machine learning tasks may be broken into two types of approaches: classification and regression. Classification tasks may be used to classify unlabeled inputs of discrete data, while regression tasks may be used to output predictions from continuous data. If distinct class labels are contained within a continuous dataset, continuous data may be transformed into discrete data points or sets of points (i.e., segmentation) through manual segmentation or using statistical analysis or mathematical approaches, which enables the application of a classification task to be applied to a previously continuous and unsegmented dataset.

Under conventional approaches, manually segmented well data may be visually analyzed by a person (e.g., geologist) to apply a classification and/or may be processed using machine learning-based classification algorithms to classify the segmented data. However, both approaches require manual segmentation of a continuous log into discrete packages prior to manual or machine-based classification or statistical analyses.

Figure 3:
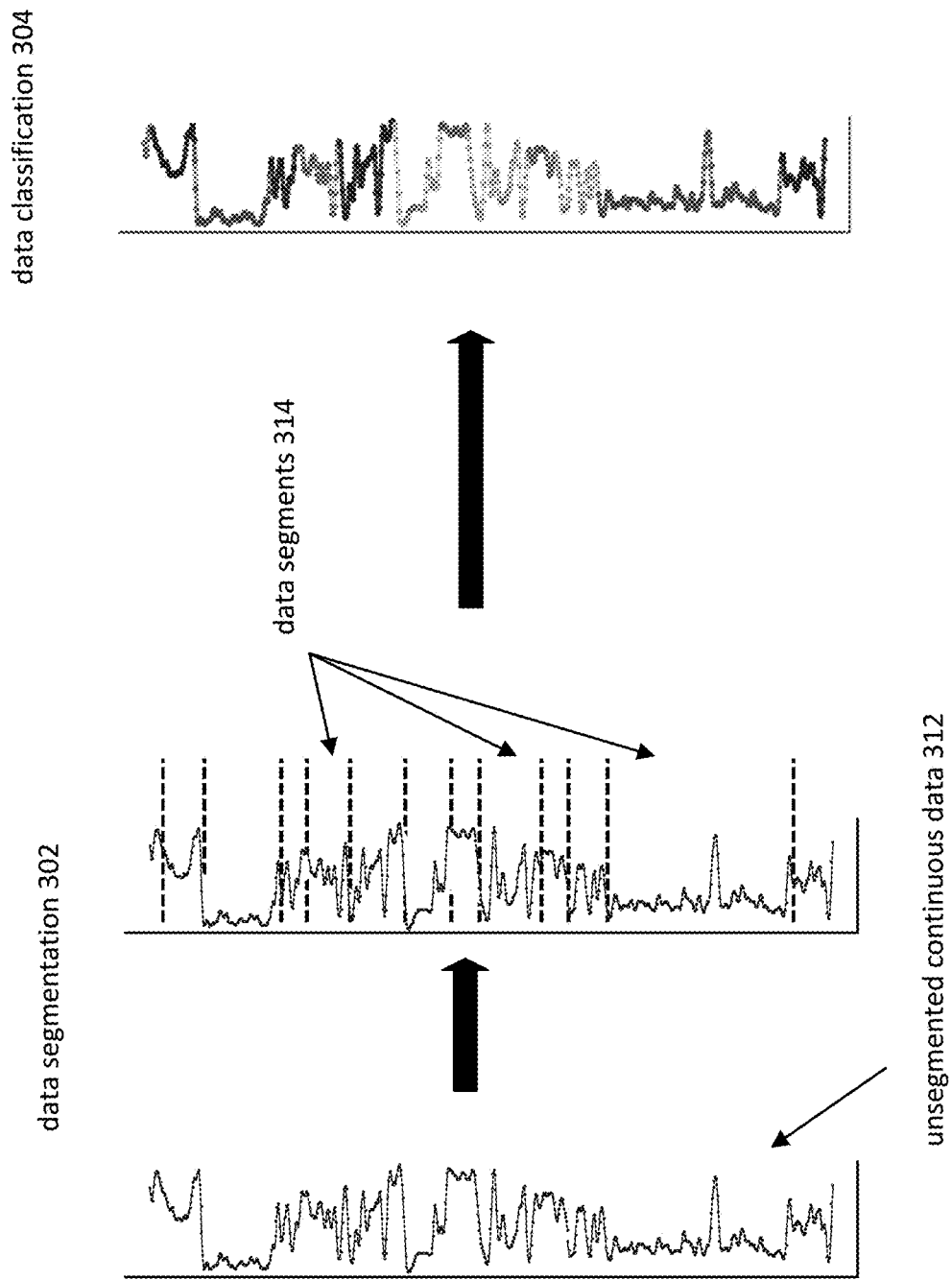
FIG. 3 illustrates example data segmentation and data classification.

For example, FIG. 3 illustrates example data segmentation 302 and data classification 304. The data segmentation 302 may include taking unsegmented continuous data 312 (e.g., well log data, synthetic log data) and segmenting the unsegmented continuous data 312 into data segment 314. Segmenting the unsegmented continuous data 312 into the data segment 314 may include dividing the unsegmented continuous data 312 into discrete packages. This process may be referred to as pre-segmenting the data as it is performed prior to the data classification 304. Pre-segmenting the data may be difficult, time-consuming, and subjective. Once the data segmentation 302 is completed, the data classification 304 may be performed on the data segments 314 to classify the discrete segments based on interpretation or through machine-learned based classification or statistical analyses run on that segment. Different classifications of the data segments 314 are shown as different shading in FIG. 3.

Similarly, synthetic logs from computer generated subsurface representations require manual segmentation to perform analysis. An example of a computer model to generate subsurface representation is a computational stratigraphy model. A computational stratigraphy model may refer to a computer model that simulates depositional and/or stratigraphic processes on a grain size scale while honoring physics-based flow dynamics. A computational stratigraphy model may simulate rock properties, such as velocity and density, based on rock-physics equations and assumptions. A computational stratigraphy model may include a forward stratigraphic model. A forward stratigraphic model may be fully based on physics of flow and sediment transport. A forward stratigraphic model may simulate and/or include simulation of a sedimentary process that recreates the way stratigraphic successions develop and/or are preserved. The forward stratigraphic model may be used to numerically reproduce the physical processes that eroded, transported, deposited and/or modified the sediments over variable time periods. The forward stratigraphic model may be used to generate a digital analog of a reservoir type or a given reservoir. In a forward modelling approach, data may not be used as the anchor points for facies interpolation or extrapolation. Rather, data may be used to test and validate the results of the simulation. Stratigraphic forward modelling may be an iterative approach, where input parameters have to be modified until the results are validated by actual data. Simulated data from computer modeling may be used to generate synthetic logs for analysis. Other types of computer models are contemplated.

Conventional approaches, such as shown in FIG. 3, require manual segmentation of computational model data to perform analysis. For example, conventional machine-learning based classification methods require that discrete package of strata/points within the logs or subsurface representations be pre-segmented, which is subjective and time-intensive, so that the segmented portions can be labeled.

To overcome these deficiencies, the approaches disclosed herein bypass pre-segmentation of data by using one or more moving window to analyze different parts of unsegmented continuous data. The approaches disclosed herein leverage the moving window(s) to scan the unsegmented continuous data to characterize the data without pre-segmenting the data. The approaches disclosed herein enable performance of classification tasks on unsegmented continuous data that do not require prior knowledge of segment boundaries or discrete packages/segments between different class elements. The approaches disclosed herein enable performance of classification tasks at different scale without re-segmentation of data. The approaches disclosed herein is applicable to unsegmented continuous data from physical well logs (e.g., gamma ray, resistivity, etc.) and from virtual well logs (e.g., numerical model data, such as data from computational stratigraphy model). The approaches disclosed herein enable any number and/or any combination of classification or analysis of portions of the unsegmented continuous data within the moving window(s).

The moving window component 104 may be configured to obtain a set of moving windows for the unsegmented continuous data. Obtaining a set of moving windows may include one or more of accessing, acquiring, analyzing, determining, examining, identifying, loading, locating, opening, receiving, retrieving, reviewing, selecting, storing, utilizing, and/or otherwise obtaining the set of moving windows. For example, obtaining a set of moving windows may include selecting how many and/or what sizes of moving windows will be used to scan the unsegmented continuous data. Obtaining a set of moving windows may include determining the number and/or sizes of the moving windows that will be used to scan the unsegmented continuous data. In some implementations, the set of moving windows may be obtained based on default (e.g., system/program/application default), user selection (e.g., user selection of number and sizes of moving windows), information relating to the unsegmented continuous data (e.g., information relating to the subsurface region, analysis of the unsegmented continuous data, metadata relating to the unsegmented continuous data), and/or other information.

A set of moving windows may include one or more moving windows. A moving window may refer to a window that is moved over unsegmented continuous data to scan different portions of the unsegmented continuous data at a time. The size of a moving window may be static (unchanging) or dynamic (e.g., changing as a function of time, changing as a function of location within the unsegmented continuous data at a time, changing during scanning of the unsegmented continuous data, changing as a function of property being scanned/evaluated to account for properties being measured/recorded at different scales and/or for properties having different sensitivities, such as rock properties not being sensitive to gamma ray and not showing much variation while showing significant variation at fine scales in resistivity or permeability). The size of the moving window may refer to an extent of the unsegmented continuous data covered by the moving window. The size of the moving window may include the shape and/or how big/small the moving window is. The size of the moving window may be defined in a single dimension (e.g., length) or in multiple dimensions (e.g., area, volume). The number of dimensions by which the moving window is defined may depend on the dimension of the unsegmented continuous data. For example, the number of dimensions by which the moving window is defined may correspond to the number of dimensions by which the unsegmented continuous data is defined. Such correspondence between the moving window and the unsegmented continuous data may enable direct application/analysis of data from numerical data model and data obtained from analysis of subsurface.

For instance, for unsegmented continuous data defined in a single dimension (e.g., time-series data, data defined as a function of a signal spatial dimension), the moving window may be defined by a single dimension. For unsegmented continuous data defined in multiple dimensions (e.g., data defined as a function multiple spatial dimensions, such as depth plus one or more lateral coordinates), the moving window may be defined by multiple dimensions (e.g., the moving window covers an area for unsegmented continuous data defined in two dimensions; the moving window covers a volume for unsegmented continuous data defined in three dimensions). Other dimensions of moving windows are contemplated.

The set of moving windows may include a single moving window with a particular size or multiple moving windows of different sizes. For example, different moving windows within the set of moving windows may have different values along one or more dimensions by which the moving windows are defined (e.g., different length, different width, different height, different area, different volume). Use of differently sized moving windows to scan the unsegmented continuous data may enable analysis of the unsegmented continuous data at different scales. Use of differently sized moving windows to scan the unsegmented continuous data may enable analysis of differently sized portions of the unsegmented continuous data.

In some implementations, at least one of the different sizes of the multiple moving windows may be determined based on a size of a subsurface feature and/or other information. The size of the subsurface feature (feature dimensions) may be obtained from one or multiple/different sources, such as training data used in classification and/or analog data from internal and/or external databases. A subsurface feature may refer to an attribute, an aspect, or a type of material(s) beneath the surface. For example, a subsurface feature may include rock characteristics, properties, formations, structures, configurations, arrangements, discrete labels, and/or other subsurface features. A subsurface feature may refer to a subsurface element, such as a channel or a part of a channel. A subsurface feature may refer to a condition relating to the subsurface region, such as a depositional environment. Other subsurface features are contemplated.

Determining a size of a moving window based on a size of a subsurface feature may include determining the size of the moving window to be scaled to likely size of the subsurface feature to be identified within the subsurface region. For example, determining a size of a moving window based on a size of a subsurface feature may include scaling the size of the moving window to the element sizes of target classification units. For instance, a classification unit may include a channel element, and the sizes of moving windows may be determined to correspond to a range of channel thickness (e.g., derived from labeled channel elements in different datasets or published information). For example, based on channel thicknesses obtained from physical well data and/or virtual well data, common window dimensions for the moving window sizes may be determined. The sizes of the moving window may be scaled to the statistics used to interpret and/or analyze the unsegmented continuous data.

In some implementations, at least one of the different sizes of the multiple moving windows may be determined independent of a size of the subsurface feature. For instance, a size of a moving window may be determined arbitrarily and not based on the size of the subsurface feature. For example, various sizes of the moving windows may be tested (e.g., from small pixel numbers to large pixel number, from two points to N−1 in the entire continuum/log). The characterization accuracy of the subsurface region using differently sized moving windows may be compared to find the optimal size(s) and/or for optimal detection of the subsurface features that may be "hidden" by other window dimensions (e.g., too large or too small to detect the subsurface feature). The characterization of the subsurface region using differently sized moving windows may be compared to determine at what scale/size the maximum amount of changes in characterization (e.g., different classification, peak of probabilities) is found. As another example, a size of a moving window may be determined based on user input (e.g., user selection of particular size, user selection of factors that determine the size). As yet another example, a size of a moving window may be determined based on training data. Training data may refer to data used to train the classifier(s) to be applied to portions of the unsegmented continuous data within the moving window.

In some implementations, at least one of the different sizes of the multiple moving window may be related to another size of the multiple moving windows. For example, based on a given size of one moving window, sizes of some or all of the other moving windows may be determined by linearly increasing the size from the given size (e.g., 4, 5, 6, 7), by linearly decreasing the size from the given size (e.g., 4, 3, 2, 1), as integer-multiples of the given size (e.g., 2×, 3×, 4×; 2×. 4×. 8×), as non-integer-multiples of the given size (e.g., fraction, square-root), and/or through other mathematical relationship to the given size of the moving window. Other determinations of the sizes of the moving windows are contemplated.

The scan component 106 may be configured to scan the unsegmented continuous data with the set of moving windows. Scanning the unsegmented continuous data with the set of moving windows may include moving the moving window(s) within the set of moving windows over the unsegmented continuous data. Scanning the unsegmented continuous data with the set of moving windows may include examining portions of the unsegmented continuous data within the moving window(s) to determine whether the portion(s) of the unsegmented continuous data indicate that corresponding portions of the subsurface region include one or more subsurface features. Scanning the unsegmented continuous data with the set of moving windows may include using the portions of the unsegmented continuous data within the moving window(s) as input to one or more data analysis tools, such as classifier, pattern matching algorithm, and/or other data analysis tools. Scanning the unsegmented continuous data with the set of moving windows may include searching for particular data/combination of data (e.g., data pattern) within the portion(s) of the unsegmented continuous data as the moving window(s) are moved over the unsegmented continuous data. Scanning the unsegmented continuous data with the set of moving windows may include performing summary statistics of data within the portions of the unsegmented continuous data within the moving window(s). These statistics and/or properties may be compared to training data and/or other data. Other types of scanning with the set of moving windows are contemplated.

The unsegmented continuous data may be scanned with the set of moving windows from one portion of the unsegmented continuous data to another portion of the unsegmented continuous data, such as from the beginning to the end and/or between different portions of the unsegmented continuous data. The unsegmented continuous data may be scanned with the set of moving windows by starting from and ending at one portion of the unsegmented continuous data—that is, the movement of the moving window(s) may end at the same portion of the unsegmented continuous data from which the scanning started. Other paths for the set of moving windows to scan the unsegmented continuous data are contemplated.

The unsegmented continuous data may be scanned with the set of moving windows in a single direction or multiple directions. A direction may refer to a course along the unsegmented continuous data which the moving window(s) are scanned/moved. A direction along which the moving window(s) are scanned may be defined by the dimension(s) that define the unsegmented continuous data. For example, for data defined as a function of time (e.g., time-series data), the direction along which the set of moving windows may be scanned may include a direction in a positive time direction and/or a direction in a negative time direction. For data defined as a function of spatial location, the direction along which the set of moving windows may be scanned may include a direction along one or more spatial dimensions (e.g., vertical direction, horizontal direction, diagonal direction, combination of vertical, horizontal, and/or diagonal direction). Scanning of the unsegmented continuous data may include a raster scan, where the unsegmented continuous data are scanned along scan lines (e.g., horizontal scan lines, vertical scan lines). In some implementations, multiple moving windows within the set of moving windows may be moved along the unsegmented continuous data in the same direction(s) (e.g., differently sized moving windows are moved in the same direction(s) over the unsegmented continuous data). In some implementations, multiple moving windows within the set of moving windows may be moved along the unsegmented continuous data in different directions (e.g., differently sized moving windows are moved in different directions over the unsegmented continuous data). Other scanning directions for the set of moving windows are contemplated.

The orientation and/or the size of the set of moving windows with respect to the unsegmented continuous data and/or the direction(s) of movement of the moving window(s) may be fixed or changed. For example, the moving window(s) may be oriented upright and/or the size of the moving window(s) may not change regardless of where the moving window(s) are positioned within the unsegmented continuous data and/or in what corresponding direction(s) in physical/virtual space the moving window(s) are being moved. As another example, the orientation of the moving window(s) and/or the size of the moving window(s) may be changed based on where the moving window(s) are positioned within the unsegmented continuous data and/or in what corresponding direction(s) in physical/virtual space the moving window(s) are being moved. For example, a moving window may be moving along a portion of data that corresponds to a path of a well. The path of the well may include changes in directions and/or curves. As the moving window is moving along the unsegmented continuous data corresponding to change(s) in path direction, the orientation of the moving window with respect to the unsegmented continuous data and/or the size of the moving window may be changed so that the scale of scanning remains consistent through the moving window movement. That is, the orientation and/or the size of the moving window may be changed to account for changes in direction of the well.

Other aspects of the moving window(s) may be changed based on where the moving window(s) are positioned within the unsegmented continuous data and/or in what corresponding direction(s) in physical/virtual space the moving window(s) are being moved. For example, the size and/or the radius of influence of the moving window(s) may be changed based on where the moving window(s) are positioned within the unsegmented continuous data and/or in what corresponding direction(s) in physical/virtual space the moving window(s) are being moved. Other changes to the set of moving windows are contemplated.

FIGS. 4A and 4B illustrate example scanning of unsegmented continuous data with moving windows. In FIGS. 4A and 4B, the unsegmented continuous data may include a well log, such as a grain size log 400, and/or data from the well log. The grain size log 400 may characterize the grain size of rock within a subsurface region as a function of depth. In FIG. 4A, the grain size log 400 may be scanned with a moving window 410. In FIG. 4B, the grain size log 400 may be scanned with a moving window 420. Scanning the grain size log 400 with the moving windows 410, 420 may include moving the moving windows 410, 420 over the grain size log 400, such as from the bottom of the grain size log 400 to the top of the grain size log 400. The moving window 420 may be smaller than the moving window 410. The moving window 420 may cover a smaller portion (e.g., smaller vertical distance, smaller time portion of time-series data) of the grain size log 400 at a moment than the moving window 410.

Scanning the grain size log 400 with the moving windows 410, 420 may include examining portions of the grain size log 400 within the moving windows 410, 420 to determine whether the portion(s) of the grain size log 400 indicate that corresponding portions of the subsurface region include one or more subsurface features. Scanning the grain size log 400 with the moving windows 410, 420 may include using the portions of the grain size log 400 within the moving windows 410, 420 as input to one or more data analysis tools, such as classifier, pattern matching algorithm, and/or other data analysis tools. Scanning the grain size log 400 with the moving windows 410, 420 may include searching for particular data and/or particular combination of data (e.g., data pattern) within the portion(s) of the grain size log 400 as the moving windows 410, 420 are moved over the grain size log 400. Scanning the grain size log 400 with the moving windows 410, 420 may include performing summary statistics of data within the portions of the grain size log 400 within the moving windows 410, 420. Other scanning of the grain size log 400 with the moving windows 410, 420 are contemplated.

The subsurface feature component 108 may be configured to determine probabilities that portions of the subsurface region include one or more subsurface features based on analysis of the portions of the unsegmented continuous data within the set of moving windows and/or other information. Determining a probability that a portion of the subsurface region includes a subsurface feature may include determining a likelihood that the portion of the subsurface region comprises and/or contains the entirety or a part of the subsurface feature. Determining a probability that a portion of the subsurface region includes a subsurface feature may include determining a value (e.g., continuous value, percentage value, fraction) and/or a category/label (e.g., includes, likely includes, may include, likely does not include, does not include) that reflects the likelihood that the portion of the subsurface region includes the subsurface feature. The subsurface region may be characterized based on and/or with the probabilities that portions of the subsurface region include one or more subsurface features and/or other information.

Analysis of portions of the unsegmented continuous data within the set of moving windows may include examination, processing, studying, and/or other analysis of the portions. Analysis of portions of the unsegmented continuous data within the set of moving windows may include using the portions as input to one or more data analysis tools, such as classifier, quantitative analysis tool, statistical analysis tool, pattern matching algorithm, and/or other data analysis tools. Analysis of the portions of the unsegmented continuous data within the set of moving windows may include searching for particular data/combination of data (e.g., data pattern) within the portions. Analysis of the portions of the unsegmented continuous data within the set of moving windows may include performing summary statistics of data within the portions. Analysis of the portion of the unsegmented continuous data within the set of moving windows may include comparison of data in one moving window to data in the same moving window at the same location in another well, to data in the same moving window at different location in another well, to data in another moving window at a different location in the same well, and/or to data in another moving window at a different location in another well. Analysis of the portion of the unsegmented continuous data within the set of moving windows may include comparison of data in one moving window to different training data and/or analog data. Analysis of portions of the unsegmented continuous data within the set of moving windows may eliminate the need to pre-segment the data to characterize the subsurface region. Analysis of portions of the unsegmented continuous data within the set of moving windows may be used to segment the data (determine boundaries and/or segments of data based on probabilities or likelihood of a subsurface feature being present or changing over different portions of the subsurface dataset). Other analysis of the portions of the unsegmented continuous data within the set of moving windows are contemplated.

In some implementations, analysis of the portions of the unsegmented continuous data within the set of moving windows may take into account portions of the unsegmented continuous data outside the set of moving windows. Analysis of the portions of the unsegmented continuous data outside a moving window may include analysis of the data itself (e.g., comparison of data within the moving window to data outside the moving window) and/or analysis of the analysis results (e.g., comparison of how analysis result, such as probability value, in one moving window has changed or remained the same as the moving window has moved). In some implementations, one or more hysteresis may be applied to remove drastic changes in probability determinations as a moving window is scanned over the unsegmented continuous data.

For example, analysis of a portion of unsegmented continuous data within a moving window may consider some or all of the unsegmented continuous data outside the moving window. The data outside the moving window may provide context and/or point of comparison for the data inside the moving window. In some implementations, the data outside the moving window that is taken into account may include data adjacent to or surrounding the moving window. For example, the analysis of a portion of unsegmented continuous data within a moving window may consider the preceding and/or subsequent portions of the unsegmented continuous data.

The amount and/or direction of the unsegmented continuous data outside the moving window that is considered may be determined based on based on default (e.g., system/program/application default), user selection (e.g., user selection of where and how much of the data outside the moving window is considered), information relating to the unsegmented continuous data (e.g., information relating to the subsurface region, analysis of the unsegmented continuous data, metadata relating to the unsegmented continuous data), the moving window (e.g., size of the moving window), similar subsurface data that has been segmented and/or analyzed (e.g., data that has been labeled/previously analyzed), and/or other information.

In some implementations, the analysis of the portions of the unsegmented continuous data within the set of moving windows may include application of one or more classifiers to the portions of the unsegmented continuous data within the set of moving windows. A classifier may refer to a tool, program, script, model, function, process, and/or algorithm that implements classification. A classifier may utilize training data to understand how a given input relates to one or more classifications (e.g., category, class, label). The classifier may be trained on previously segmented and labeled data. In some implementations, the classifier may be trained on defined elements within the continuous dataset (e.g., well logs, grain size logs) and used to scan unsegmented, unlabeled log of the same type to determine that the likelihood that certain subsurface features exist within different sections of the log. The classifier may be trained on defined elements within different data (e.g., trained on defined elements within one well log for application on other well logs) and/or within the same data (e.g., trained on defined element within one portion of a well log for application to other portions of the well log). The data may be transformed to single data points through one or more processes, such as statistical analysis and/or manual segmentation. Training may be done once or changed/re-performed as desired.

Input to a classifier (e.g., machine learning classifier, perceptron, naïve Bayes, decision tree, logistic regression, k-nearest neighbor, artificial neural network/deep learning, support vector machine) may include the portion of the unsegmented continuous data within a moving window and/or other information. The portion of the unsegmented continuous data within a moving window may be transformed into single data point(s) to be input into the classifier. Output of a classifier may include probability of one or more category, class, and/or label for the portion of the unsegmented continuous data and/or the corresponding portion of the subsurface region. Output of a classifier may include a labeling (e.g., identification of a particular category, class, label) and/or likelihood of labeling for the portion of the unsegmented continuous data and/or the corresponding portion of the subsurface region. Multiple/different classifiers may be used to obtain different sets of probabilities/labeling for the portions of the unsegmented continuous data.

For example, to identify a channel element, a training data-set of classified channel elements within an individual grain size log may be manually labeled. A decision tree classifier may be trained on the summary statistics from individual channel/non-channel elements within the grain size logs. These may be known in advance. For example, if classified data is being used to train a model, the channel locations within the separate set of data may be known. Moving windows sized to a range of channel thicknesses (e.g., derived from labeled channel elements) may be scanned over the data to be classified, with summary statistics computed on individual windowed portion of the data to be used as input to the decision tree classifier. The decision tree classifier may output the probability that a channel element exists within a particular window of data/corresponding portion of the subsurface region. The probabilities obtained from different moving windows may be combined to obtain overall probabilities (e.g., channel likelihood curve or metric) in different portions of the subsurface region. In some implementations, a single classifier or multiple classifiers may evaluate the likelihood of different labels that could be combined so that there are multiple probabilities (e.g., a 90% probability that the feature is a channel and 10% probability that the feature is a "sheet element" or other label).

Figure 5A:
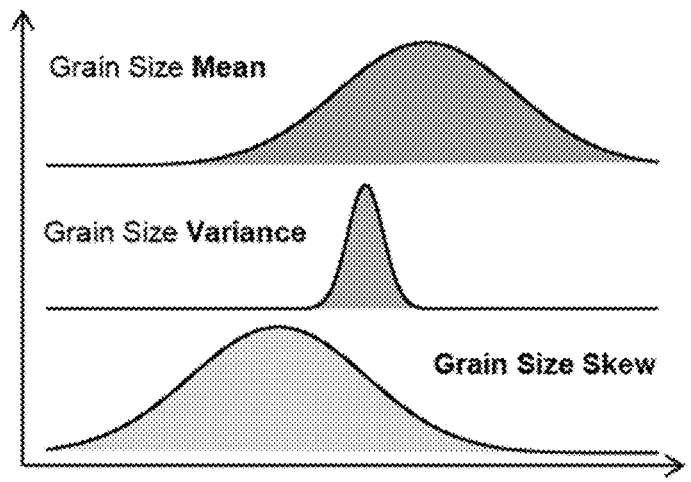
FIG. 5A illustrates example stratigraphic metrics of channels.

FIG. 5A illustrates example stratigraphic metrics of channels. The stratigraphic metrics of channels may include curves/distributions of grain size mean, grain size variance, grain size skew, summary statistics from known channel examples, and/or other subsurface properties. The stratigraphic metrics of channels shown in FIG. 5A may be used to identify the probability that different portions of the subsurface region include a channel element. Portions of the unsegmented continuous data within moving window(s) may be compared to the stratigraphic metrics of labeled, known, an/do previously analyzed channels to determine the probability of the inclusion of the channel element. Greater match between the data within the moving window to the stratigraphic metrics of channels may result in higher likelihood while greater mismatch between the data within the moving window to the stratigraphic metrics of channels may result in lower likelihood. Different parts of the stratigraphic metrics of channels may be weighted equally or differently for probability determination. For instance, matching of unsegmented continuous data within a moving window to grain size mean may be weighted more than matching with grain size variance, or vice versa. Different properties/property curves may be weighted equally or differently for probability determination. For instance, it may be easier to detect channels in Gamma Ray logs than in Resistivity logs. Other combination of weighting of parts of stratigraphic metrics are contemplated.

Figure 5B:
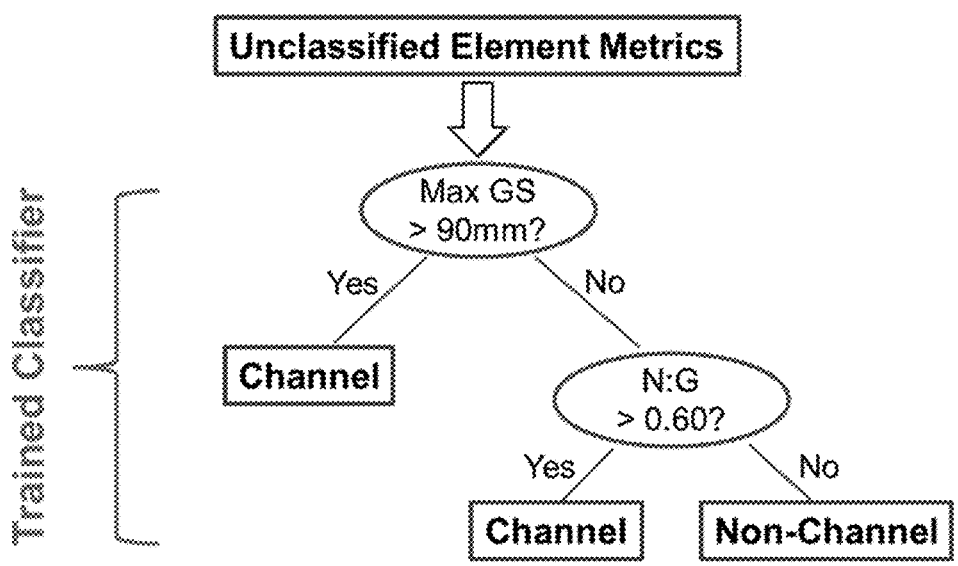
FIG. 5B illustrates an example logic of a decision tree classifier.

FIG. 5B illustrates an example logic of a decision tree classifier. The logic may be defined by the labels desired and the analyses being performed on the data within the moving windows. For example, the logic may include analysis of maximum grain size of unclassified element metrics. Based on the maximum grain size being larger than 90 mm, the data portion/corresponding portion of the subsurface region may be classified as being a channel element. Based on the maximum grain size not being larger than 90 mm, the net-to-gross ratio of unclassified element metrics may be analyzed. Based on the net-to-gross ratio being larger than 0.60, the data portion/corresponding portion of the subsurface region may be classified as being a channel element. Based on the net-to-gross ratio not being larger than 0.60, the data portion/corresponding portion of the subsurface region may be classified as not being a channel element. The levels/layers and/or organization of the classifier may be arranged in different/multiple ways. Other logics of decision tree classifiers are contemplated.

Figure 6:
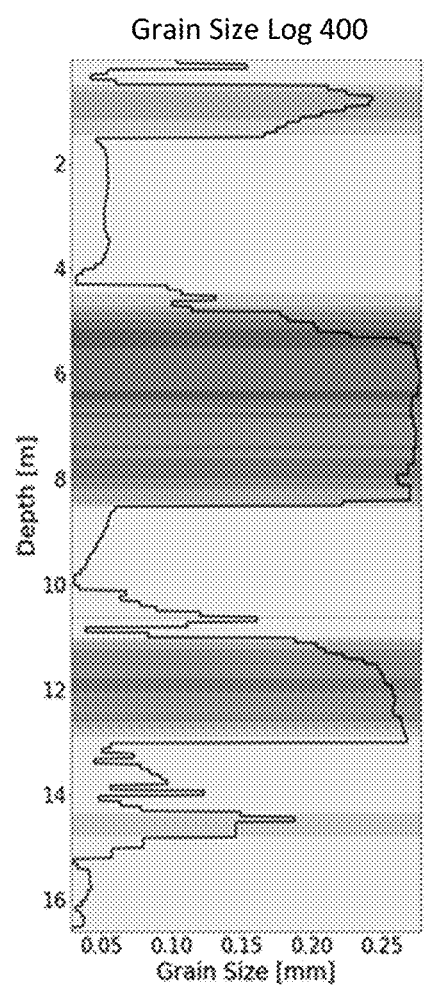
FIG. 6 illustrates example graphical representation of probabilities that portions of a subsurface region include a subsurface feature.

FIG. 6 illustrates example graphical representation of probabilities that portions of a subsurface region include a subsurface feature. Shading overlaid over the grain size log 400 may reflect the value (continuous value) of the probabilities that different portions of the subsurface region include a subsurface feature (e.g., channel element). The probabilities may be determined based on analysis of the portions of the grain size log 400 within a set of moving windows (e.g., the moving windows 410, 420) as the grain size log 400 is scanned with the set of moving windows. Darker shading may reflect higher probability that the portions of the subsurface region include a subsurface feature. The probabilities may be thresholded and given a label. Changes in the thresholded labels over the depth may be candidate for segmentation boundaries.

In some implementations, different (separate) sets of the probabilities over the unsegmented continuous data may be determined based on the set of moving windows including multiple moving windows of different sizes, the unsegmented continuous data characterizing multiple properties of the subsurface region, and/or usage of different classifiers. For example, scanning the unsegmented continuous data with one moving window may result in one set of probabilities as to different portions of the subsurface region including a particular subsurface feature. Scanning the unsegmented continuous data with another moving window of a different size may result in another set of probabilities as to different portions of the subsurface region including the particular subsurface feature. Additional sets of probabilities may be determined by using additional moving windows of different sizes.

As another example, different properties of the subsurface region may be analyzed to determine different sets of probabilities. For example, for a portion of the unsegmented continuous data, a particular or a particular combination of properties of the subsurface region may be used in the analysis to determine the probability that the corresponding portion of the subsurface region include a particular subsurface feature. For the same portion of unsegmented continuous data, a different property or a different combination of properties of the subsurface region may be used in the analysis to determine a separate probability. Thus, different properties (e.g., different single properties, different combination of properties) may be used to determine different sets of probabilities. For instance, different sets of probabilities may be determined based on separate usage of gamma ray logs and resistivity logs when analyzing portions of the data within the moving window(s).

As yet another example, different analysis tools (e.g., different classifiers) may be used to determine different sets of probabilities. For example, for portions of the unsegmented continuous data within the moving window(s), multiple classifiers and/or multiple data analyses techniques (e.g., quantitative analysis, statistical analysis, pattern matching) may be applied to obtain separate sets of probabilities.

Aggregated probabilities may be determined based on aggregation of different sets of the probabilities over the unsegmented continuous data and/or other information. Aggregation of different sets of the probabilities may include aggregation of different sets of probabilities determined based on the set of moving windows including multiple moving windows of different sizes, the unsegmented continuous data characterizing multiple properties of the subsurface region, usage of different classifiers, and/or usage of different analyses or labels (e.g., indicating probabilities of different labels, such as 90% channel element and 10% sheet element). Aggregating different sets of the probabilities may result in mapping of the resulting probabilities of different scales, different properties, and/or different classifiers onto the portions of the subsurface region.

In some implementations, different sets of probabilities may be aggregated based on stacking. For instance, for a portion of the subsurface region, corresponding probabilities from different calculations may be averaged together to form aggregated probabilities. Probabilities from different calculations may be averaged within a window, and the window-averaged probability values may be combined (e.g., averaged) across the different calculations. Probabilities from different calculations may be weighted equally or differently for aggregation. For example, probabilities calculated from a moving window with a size that was scaled to an average size of the subsurface feature may be weighted more in aggregation than moving windows not scaled to the average size of the subsurface feature. Such aggregation of different sets of probabilities may enable identification of full package within the subsurface region, as well the boundaries of the subsurface features. Similarly, probabilities calculated from different subsurface properties and/or different classifiers may be weighted equally or differently for aggregations. Other aggregations of different sets of probabilities are contemplated. In some implementations, discrete labeling may be applied directly to a moving window without probabilities if desired.

In some implementations, the portions of the subsurface region may be labeled as including or not including the subsurface feature(s) based on evaluation (e.g., thresholding) of the probabilities and/or other information. For example, thresholding and/or other evaluation may convert the probabilities into discrete classifications (e.g., covert a probability log into a discrete classified log). For example, portions of the subsurface region may be labeled as including or not including the subsurface feature(s) based on thresholding/evaluation of one or more sets of probabilities, based on thresholding/evaluation of aggregated probabilities, and/or based on thresholding/evaluation of other information determined from the probabilities. Thresholding/evaluation may be performed for non-probabilistic cases in which probabilities are not used, such as if a label is a sublabel or a parent label of another category.

Thresholding may compare the probability to one or more values to determine whether to label the corresponding portion of the subsurface as including or not including a subsurface feature. For example, thresholding may compare the probability to a value and label the corresponding portion of the subsurface as including the subsurface feature based on the probability being larger than the value and as not including the subsurface feature based on the probability being smaller than the value. As another example, thresholding may compare the probability to a high value and a low value and label the corresponding portion of the subsurface as including the subsurface feature based on the probability being larger than the high value and as not including the subsurface feature based on the probability being smaller than the low value. For probability values that fall between the high value and the low value, additional analysis may be performed and/or suggested. For instance, hysteresis may be used to label such portions of the subsurface according to labeling of the adjacent or surrounding portions of the subsurface.

In some implementation, thresholding may be applied to portions of the subsurface within a window. For example, rather than applying thresholding to individual probabilities calculated for the subsurface region, the probabilities within a window may be combined (e.g., averaged) before applying the thresholding. Such thresholding of the probabilities may enable labeling of groups of probabilities. For instance, a window may be moved over the probabilities to determine which portions of the subsurface region satisfies or does not satisfy the thresholding value(s).

In some implementations, thresholding may include hierarchical thresholding. Hierarchical thresholding may distinguish between different sets of probabilities, such as different sets of probabilities calculated using different scales, different properties, and/or different classifiers. Hierarchical thresholding may apply different thresholding values (values to which probability values are compared) to different sets or probabilities. Hierarchical thresholding may require thresholding to be satisfied for a single thresholding, for multiple thresholding, and/or for all thresholding. For instance, for different sets of probabilities calculated using three differently sized moving windows, hierarchical thresholding may require thresholding to be satisfied within a single set of probabilities, within multiple sets of probabilities, within different combinations of probabilities, or within all sets of probabilities.

Hierarchical thresholding may be applied in a sequence with logic that distinguishes whether a particular thresholding was satisfied or not. For instance, hierarchical thresholding may start with an initial thresholding being applied to a particular set of probabilities. Based on the initial thresholding being satisfied (e.g., probability value is greater than the thresholding value), one or more additional thresholding may be applied to additional set(s) of probabilities. Based on the initial thresholding not being satisfied (e.g., probability value is lower than the thresholding value), additional threshold may not be applied (e.g., the portion is labeled as not including the subsurface feature) or different thresholding may be applied to the same and/or additional set(s) of probabilities. Such hierarchical thresholding may be referred to as decision tree thresholding.

In some implementations, analysis of the portions of the unsegmented continuous data within the set of moving windows may be used to perform feature matching between different subsurface regions, such as between different wells and/or between different segments of wells. Analysis of the portions of the unsegmented continuous data within the set of moving windows may be used to perform piece-wise comparison of subsurface properties within different subsurface regions. For example, a subsurface feature (target of analysis) may include one or more features of a particular well segment (e.g., vertical well segment, horizontal well segment) and determination of the probabilities that the portions of the subsurface region include the subsurface feature may include determination of probabilities that the portions of a different well segment (e.g., horizontal well segment, vertical well segment) matches the feature(s) of the particular well. In some implementations, feature matching may be performed between same types of wells. For example, features of a vertical well may be compared/matched with features of another vertical well. Features of a horizontal well may be compared/matched with features of another horizontal well. Features of a deviated well may be compared/matched with features of another deviated well. In some implementations, feature matching may be performed between different types of wells. For example, features of a vertical well may be compared/matched with features of a horizontal well or a deviated well. Features of a horizontal well may be compared/matched with features of a vertical well or a deviated well. Features of a deviated well may be compared/matched with features of a vertical well or a horizontal well. Matching/comparison between other types of wells are contemplated.

In some implementations, the orientation of the moving window may be changed based on the direction of the well segment so that the scale of scanning remains consistent between differently directed well segments (e.g., between a vertical well segment and a horizontal well segment).

Figure 7A:
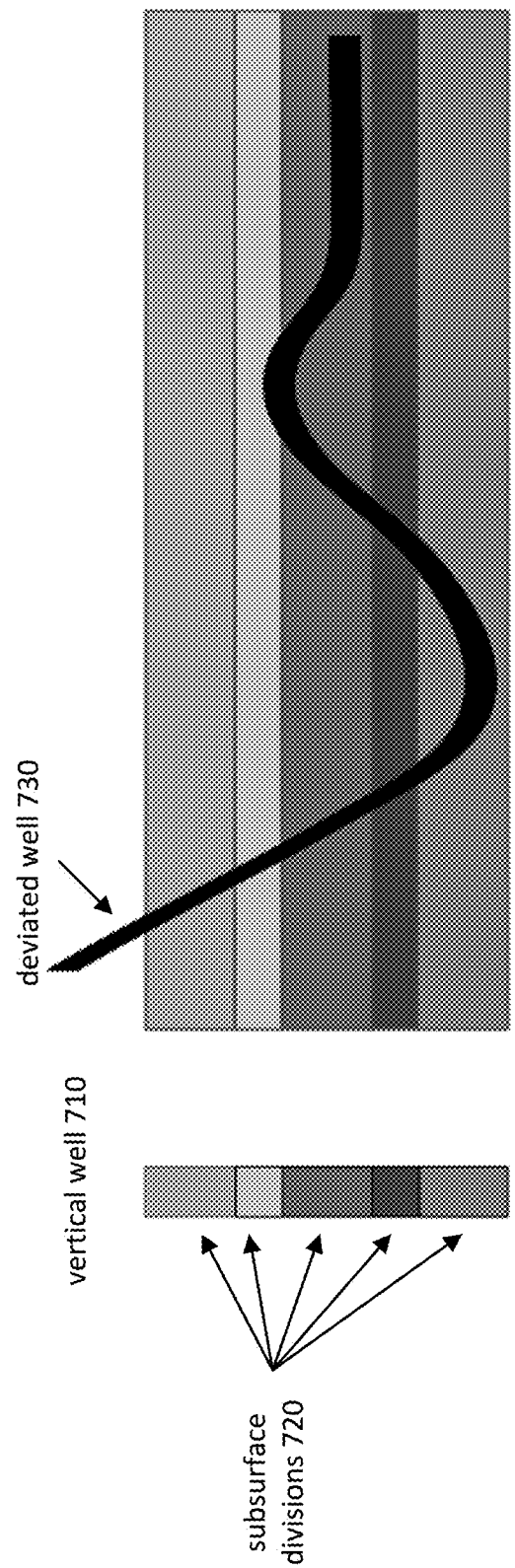
FIG. 7A illustrates example wells.

For example, FIG. 7A illustrates an example vertical well 710 and an example deviated well 730. The vertical well 710 may include subsurface divisions 720, which may include different layers, formations, and/or other grouping of subsurface elements. The deviated well 730 may be drilled such that it initially travels diagonally downward, then diagonally upward, and then diagonally downward before traveling in a horizontal direction. Manually matching subsurface properties of the deviated well 730 to subsurface properties of the vertical well 710 may be difficult and time-consuming, especially as data (e.g., time-series data) is not defined along the same dimension(s). For example, data for the vertical well 710 may be acquired in time with progression of time corresponding to deeper depths. Data for the deviated well 730 may be acquired in time with progress of time corresponding to deeper depths for some durations of time, corresponding to shallower depths for other durations of time, and corresponding to the same depth for yet other durations of time. That is, because of the changing drilling directions of the deviated well 730, the time at which the data was acquired may not reflect the depth of the deviated well 730.

Figure 7B:
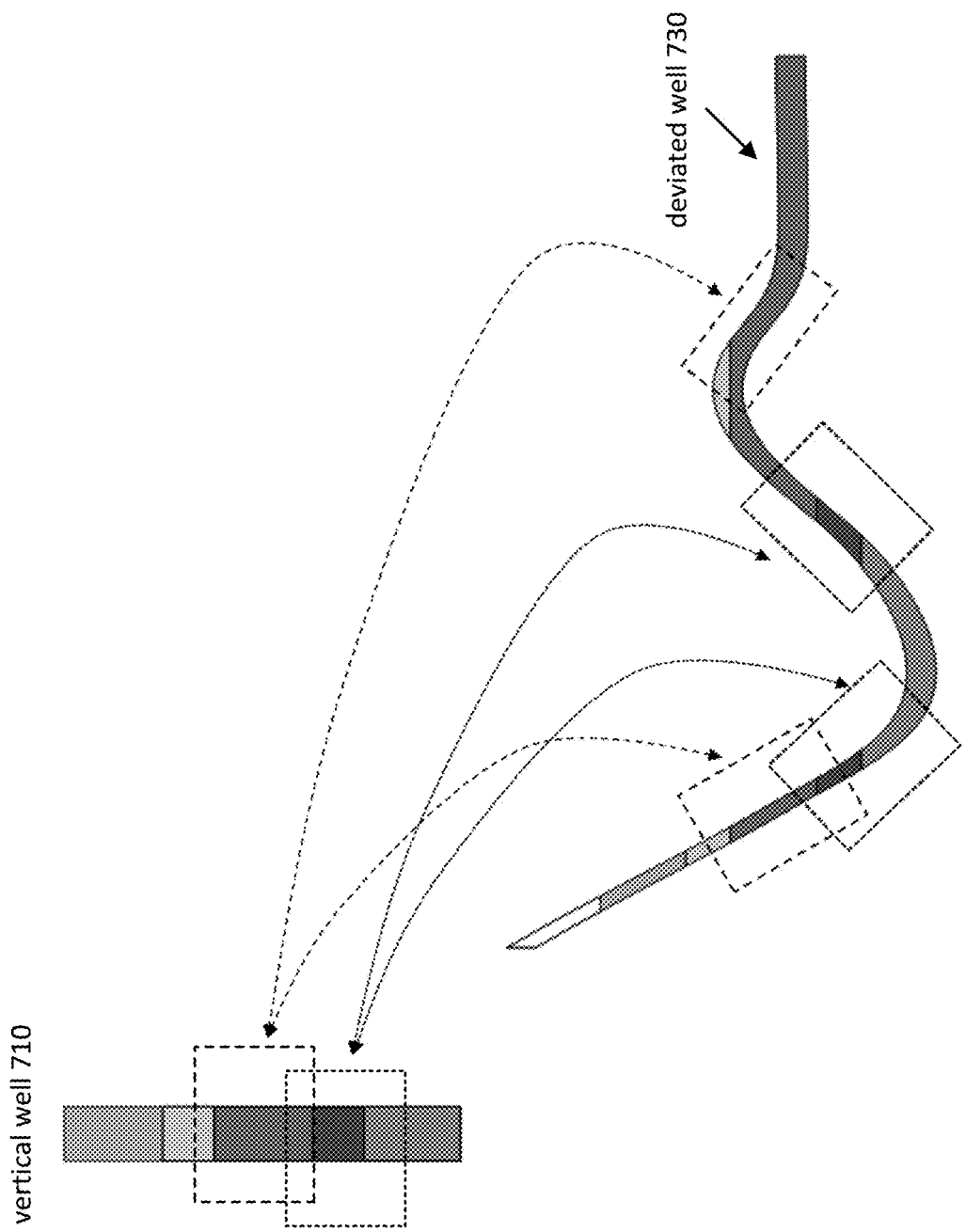
FIG. 7B illustrates example feature matching between wells shown in FIG. 7A.

Feature matching may be performed between two or more wells. Feature matching may be performed between wells of same type (e.g., between vertical wells, between horizontal wells, between deviated wells). Feature matching may be performed between wells of different types (e.g., between vertical well(s) and horizontal well(s), between vertical well(s) and deviated well(s), between horizontal well(s) and deviated well(s)). FIG. 7B illustrates example feature matching between the wells 710, 730 shown in FIG. 7A. Feature matching may be performed based on statistical comparison of data contained in windows, using time-series pattern recognition, such as dynamic time warping on signal comparison, and/or based on other analysis of the data. Windows may be rotated to compensate for change in direction of the deviated well 730. Windows may be rotated to compensate for differences in directions of the wells 710, 730. Subsurface patterns across multiple moving windows may be detected to determine matching in pattern/probability of pattern matching. Thus, the moving windows may be used to automate feature matching between well segments of different directions. Other types of feature matching between different subsurface regions using moving windows are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of the computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of the computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
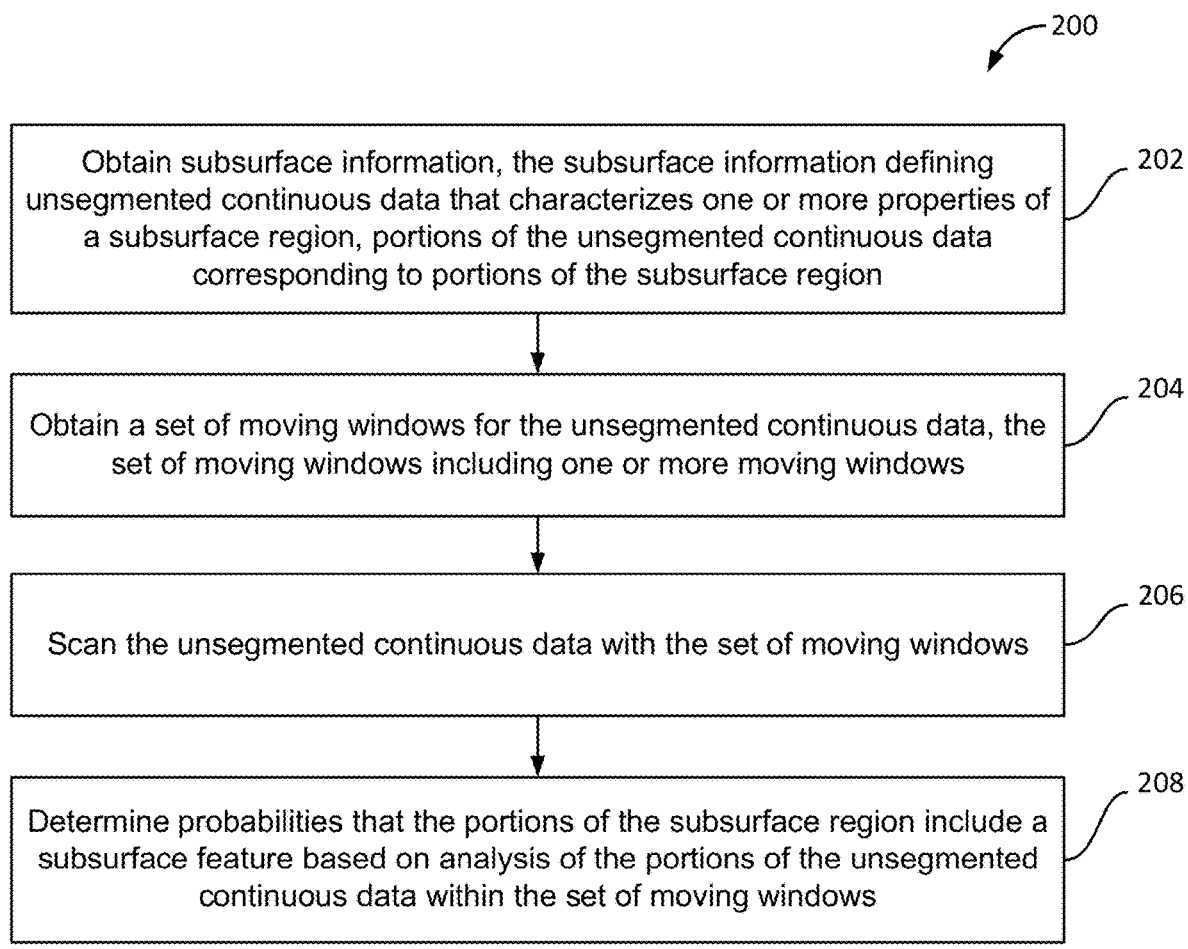
FIG. 2 illustrates an example method for characterizing a subsurface region.

FIG. 2 illustrates method 200 for characterizing a subsurface region. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, subsurface information and/or other information may be obtained. The subsurface information may define unsegmented continuous data and/or other data. The unsegmented continuous data may characterize one or more properties of a subsurface region. Portions of the unsegmented continuous data may correspond to portions of the subsurface region. In some implementation, operation 202 may be performed by a processor component the same as or similar to the subsurface information component 102 (Shown in FIG. 1 and described herein).

At operation 204, a set of moving windows for the unsegmented continuous data may be obtained. The set of moving windows may include one or more moving windows. In some implementation, operation 204 may be performed by a processor component the same as or similar to the moving window component 104 (Shown in FIG. 1 and described herein).

At operation 206, the unsegmented continuous data may be scanned with the set of moving windows. In some implementation, operation 206 may be performed by a processor component the same as or similar to the scan component 106 (Shown in FIG. 1 and described herein).

At operation 208, probabilities that the portions of the subsurface region include a subsurface feature may be determined based on analysis of the portions of the unsegmented continuous data within the set of moving windows and/or other information. In some implementation, operation 208 may be performed by a processor component the same as or similar to the subsurface feature component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for characterizing a subsurface region, the system comprising:
one or more physical processors configured by machine-readable instructions to:
obtain subsurface information, the subsurface information defining unsegmented continuous data that characterizes one or more properties of the subsurface region, portions of the unsegmented continuous data corresponding to portions of the subsurface region;
obtain a set of moving windows for the unsegmented continuous data, the set of moving windows including multiple moving windows of different sizes;
scan the unsegmented continuous data with the set of moving windows;

determine probabilities that the portions of the subsurface region include a subsurface feature based on analysis of the portions of the unsegmented continuous data within the set of moving windows, wherein different sets of the probabilities over the unsegmented continuous data are determined based on the set of moving windows including the multiple moving windows of different sizes; and;

determine aggregated probabilities that the portions of the subsurface region include the subsurface feature based on aggregation of the different sets of the probabilities over the unsegmented continuous data, wherein the aggregated probabilities that the portions of the subsurface region include the subsurface feature are presented within a graphical representation.

2. The system of claim 1, wherein the analysis of the portions of the unsegmented continuous data within the set of moving windows includes application of a classifier and/or data analysis to the portions of the unsegmented continuous data within the set of moving windows.

3. The system of claim 1, wherein at least one of the different sizes of the multiple moving windows is determined based on a size of the subsurface feature.

4. The system of claim 1, wherein at least one of the different sizes of the multiple moving windows is determined independent of a size of the subsurface feature.

5. The system of claim 1, wherein:
different sets of the probabilities over the unsegmented continuous data are further determined based on the unsegmented continuous data characterizing multiple properties of the subsurface region.

6. The system of claim 1, wherein the portions of the subsurface region are labeled as including or not including the subsurface feature based on thresholding of the aggregated probabilities.

7. The system of claim 1, wherein the unsegmented continuous data is scanned with the set of moving windows in a single direction or multiple directions.

8. The system of claim 1, wherein the subsurface region includes a horizontal well segment.

9. The system of claim 8, wherein the subsurface feature includes a feature of a vertical well segment, and determination of the probabilities that the portions of the subsurface region include the subsurface feature includes determination of probabilities that the portions of the horizontal well segment matches the feature of the vertical well segment.

10. A method for characterizing a subsurface region, the method comprising:
obtaining subsurface information, the subsurface information defining unsegmented continuous data that characterizes one or more properties of the subsurface region, portions of the unsegmented continuous data corresponding to portions of the subsurface region;

obtaining a set of moving windows for the unsegmented continuous data, the set of moving windows including multiple moving windows of different sizes;

scanning the unsegmented continuous data with the set of moving windows;

determining probabilities that the portions of the subsurface region include a subsurface feature based on analysis of the portions of the unsegmented continuous data within the set of moving windows, wherein different sets of the probabilities over the unsegmented continuous data are determined based on the set of moving windows including the multiple moving windows of different sizes; and determining aggregated probabilities that the portions of the subsurface region include the subsurface feature based on aggregation of the different sets of the probabilities over the unsegmented continuous data, wherein the aggregated probabilities that the portions of the subsurface region include the subsurface feature are presented within a graphical representation.

11. The method of claim 10, wherein the analysis of the portions of the unsegmented continuous data within the set of moving windows includes application of a classifier and/or data analysis to the portions of the unsegmented continuous data within the set of moving windows.

12. The method of claim 10, wherein at least one of the different sizes of the multiple moving windows is determined based on a size of the subsurface feature.

13. The method of claim 10, wherein at least one of the different sizes of the multiple moving windows is determined independent of a size of the subsurface feature.

14. The method of claim 10, wherein:
different sets of the probabilities over the unsegmented continuous data are further determined based on the unsegmented continuous data characterizing multiple properties of the subsurface region.

15. The method of claim 10, wherein the portions of the subsurface region are labeled as including or not including the subsurface feature based on thresholding of the aggregated probabilities.

16. The method of claim 10, wherein the unsegmented continuous data is scanned with the set of moving windows in a single direction or multiple directions.

17. The method of claim 10, wherein the subsurface region includes a horizontal well segment.

18. The method of claim 17, wherein the subsurface feature includes a feature of a vertical well segment, and determination of the probabilities that the portions of the subsurface region include the subsurface feature includes determination of probabilities that the portions of the horizontal well segment matches the feature of the vertical well segment.

* * * * *